Patented Oct. 4, 1932

1,881,093

UNITED STATES PATENT OFFICE

WILLIAM L. OWEN, OF BATON ROUGE, LOUISIANA, AND EDWARD W. HERR, OF FREEPORT, NEW YORK, ASSIGNORS TO DARCO SALES CORPORATION, OF NEW YORK, N. Y., A CORPORATION OF DELAWARE

PROMOTION OF FERMENTATION

No Drawing. Application filed April 29, 1929. Serial No. 359,170.

For several years it has been known that the alcoholic fermentation of sugars by yeast could be accelerated by the apparently catalytic action of certain substances which in other respects appear to be chemically inert under the conditions of use in this operation. The beneficial effect of the substances tried has been attributed to various causes including rapid liberation of carbon dioxide in the presence of the chemically inert substance with consequent lowering of the carbon dioxide concentration in the fermenting solution, the greater production of acetaldehyde, absorption of toxic substances inimical to the functions of the micro-organisms, absorption of alcohol, stimulating effect on the micro-organisms, etc.

In the ordinary practice of making alcohol by the fermentation of molasses solutions there is a fairly definite limit to the yield of alcohol in respect to the theoretical maximal yield under given conditions. Also it is considered essential that the molasses be diluted if the best results are to be obtained, and this dilution is usually by about 5 volumes of water for 1 of molasses so that the solution is of about 16 to 20 Brix density. This may be varied in accordance with the percentage of sugar content in the molasses, the time of fermentation and other factors. It is desirable that the density be kept as high as practical from the fermentation standpoint so as to reduce the later evaporation or distillation expense.

We have discovered that by the addition of an activated decolorizing carbon to the fermentable mixture we are able to get a larger yield of alcohol in respect to the theoretical limit than has heretofore been the practice.

We have further discovered that by the use of the activated decolorizing carbon the molasses may be fermented at a very much greater density than has been the usual practice, thus reducing the distillation expense.

In carrying out the invention the molasses may be preliminarily prepared according to the ordinary methods employed in connection with fermentation, for instance, by sterilization, acidifying with sulphuric acid, addition of ammonium sulphate, etc. The quantity of activated carbon added may vary within comparatively wide limits, but experiment indicates that about 10 grams of the activated carbon for each gallon of molasses solution fermented gives very satisfactory results.

If the molasses be of the usual 20 Brix density the seed yeast and activated carbon are added to the molasses and the fermentation proceeds according to the usual practice, but a higher yield of alcohol results.

We have found, that in order to get the most efficient yield from molasses of high density, it is desirable to use the following specific procedure:

The seed yeast and activated carbon are thoroughly mixed and the mixture is not introduced directly in the heavy density, molasses solution, but into one of approximately 20 Brix density. After this solution has fermented in the fermenters down to approximately 12 to 15 Brix density, which will require from 8 to 10 hours, there is added such a quantity of a solution of molasses of such high density, for instance 45 Brix density, as would have brought the density of the mixture to 35 Brix had it been added prior to the initiation of fermentation. The fermentation of the solution which will now be of 27 to 30 Brix density, proceeds at an unimpaired rate and is completed within approximately the same length of time as a 20 Brix solution would ordinarily require.

When the fermentation has been completed with the use of the ordinary appartus and under the usual operating conditions, except as above stated, the solution is treated in the usual manner for the recovery and purification of the alcohol produced.

Our improved process results in a very material shortening of the time required for the fermentation of a given mass of molasses and a substantial increase in the yield. To secure these results it is not essential that the molasses solution be at other than the usual density of 16 to 20 Brix.

Although the results obtained by the use of different kinds of activated carbon may vary somewhat, we have found that the best results are obtained by the use of the product sold under the name of "Darco" and which is produced from lignite by heat treatment and the removal of such ingredients as are readily soluble in acid.

The exact cause of the action of activated decolorizing carbon in facilitating the fermentation is not known with certainty, but we believe that such action is not due solely to the porosity or the fineness of subdivision and is not necessarily a function of the decolorizing power which makes this material valuable in other industries.

The activated carbon being in a finely subdivided state and of comparatively low specific gravity will not readily settle to the bottom, but will remain dispersed throughout the fermenting solution. The carbon particles form nuclei on which the carbon dioxide gas accumulates until sizable bubbles are formed. The particles with the gas thereon tend to rise until the bubble breaks away. The bubbles in passing up through the solution, aid in keeping the carbon in suspension.

Having thus described our invention, what we claim as new and desire to secure by Letters Patent is:

1. The process of producing alcohol which includes fermenting a molasses solution of at least 27 Brix density in the presence of yeast and an activated carbon.

2. The process of producing alcohol from molasses which includes fermenting a molasses solution of at least 27 Brix density by the action of yeast in the presence of about 10 grams of finely subdivided activated carbon per gallon of molasses solution.

3. The process of producing alcohol from molasses which includes fermenting a molasses solution by the action of yeast in the presence of about 10 grams of finely subdivided activated carbon per gallon of molasses solution.

4. The process of fermenting molasses by the action of yeast which includes partially fermenting a molasses solution in the presence of activated carbon, adding molasses of greater density, and continuing the fermentation to completion.

5. The process of fermenting molasses by the action of yeast which includes partially fermenting a molasses solution of about 20 Brix density in the presence of activated carbon until the density has decreased to about 12 to 15 Brix, adding such an amount of molasses as would have brought the original density to about 35 Brix, and continuing the fermentation of the mixture.

6. The process of fermenting molasses by the action of yeast which includes partially fermenting a molasses solution in the presence of activated carbon, adding molasses to increase the density of the mixture to a point above that of said first solution and completing the fermentation.

7. The process of producing alcohol by the fermentation of a molasses solution by the action of yeast in the presence of activated carbon which includes increasing the density of the solution when such fermentation is partially completed.

8. The process of producing alcohol by the fermentation of a molasses solution by the action of yeast which includes mixing yeast and an activated carbon, and adding such mixture to a molasses solution.

9. The process of producing alcohol by the fermentation of a molasses solution by the action of yeast which includes adding to a molasses solution a mixture of yeast and activated carbon.

10. The process of producing alcohol by the fermentation of a molasses solution by the action of yeast, which includes mixing with the molasses solution, yeast and activated carbon, and conducting the fermentation by the action of the yeast in the presence of the carbon.

11. The process of producing alcohol from molasses, which includes fermenting a molasses solution by the action of yeast in the presence of finely subdivided activated carbon disseminated through the molasses solution.

12. The process of producing alcohol, which includes mixing activated carbon in a molasses solution, and propagating yeast in the mixture.

13. The process of producing alcohol, which includes mixing activated carbon in a fermentable solution, and propagating yeast in the mixture.

Signed at New York in the county of New York and State of New York this 27th day of April 1929.

WM. L. OWEN.
EDWARD W. HERR.